US012700273B2

(12) United States Patent
Yamamoto et al.

(10) Patent No.: US 12,700,273 B2
(45) Date of Patent: Aug. 4, 2026

(54) INFORMATION PROCESSING DEVICE

(71) Applicant: TOYOTA JIDOSHA KABUSHIKI KAISHA, Toyota (JP)

(72) Inventors: Masafumi Yamamoto, Nagakute (JP); Atsushi Tabata, Okazaki (JP); Hideaki Bunazawa, Tokyo (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/973,692

(22) Filed: Dec. 9, 2024

(65) Prior Publication Data

US 2025/0292639 A1 Sep. 18, 2025

(30) Foreign Application Priority Data

Mar. 15, 2024 (JP) ................................ 2024-040811

(51) Int. Cl.
*G07C 5/10* (2006.01)
*F01M 1/18* (2006.01)

(52) U.S. Cl.
CPC ................ *G07C 5/10* (2013.01); *F01M 1/18* (2013.01)

(58) Field of Classification Search
None
See application file for complete search history.

(56) References Cited

U.S. PATENT DOCUMENTS

| | | | | |
|---|---|---|---|---|
| 2013/0297141 | A1* | 11/2013 | Yun ......................... | G06F 17/00 701/29.1 |
| 2014/0297045 | A1* | 10/2014 | Apostolides ............ | F04B 53/20 700/282 |
| 2015/0066259 | A1* | 3/2015 | Thompson ............... | F01M 1/18 180/65.265 |
| 2017/0284068 | A1* | 10/2017 | Nakamura ............. | G01N 33/30 |
| 2019/0292944 | A1* | 9/2019 | Mason ...................... | F01M 1/02 |
| 2019/0338792 | A1* | 11/2019 | Hayashi .................. | F15B 7/008 |

FOREIGN PATENT DOCUMENTS

JP 2008-108247 A 5/2008

* cited by examiner

*Primary Examiner* — Daniel L Greene
(74) *Attorney, Agent, or Firm* — SoraIP, Inc.

(57) ABSTRACT

The processing device of the information processing device includes: a first step of calculating a relative frequency distribution of the original data; a second step of setting a plurality of time windows for cutting out data of a part of the period of the original data; a third step of cutting out data from the original data; a fourth step of calculating a relative frequency distribution in the extracted data; and a fifth step of calculating an error between the relative frequency distribution in the original data and the relative frequency distribution in the extracted data, and performs a search process of repeatedly executing the trial from the second step to the fifth step by changing the setting of the plurality of time windows.

7 Claims, 6 Drawing Sheets

INFORMATION PROCESSING DEVICE

CROSS-REFERENCE TO RELATED APPLICATION

This application claims priority to Japanese Patent Application No. 2024-040811 filed on Mar. 15, 2024, incorporated herein by reference in its entirety.

BACKGROUND

1. Technical Field

The present disclosure relates to an information processing device.

2. Description of Related Art

Japanese Unexamined Patent Application Publication No. 2008-108247 (JP 2008-108247 A) discloses an information processing device that reduces the size of data for analysis by compressing original data for analysis. The original data for analysis are data collected over a predetermined period using a sensor mounted on a vehicle.

The information processing device disclosed in JP 2008-108247 A compresses data by extracting, from the original data, data acquired at the time when a certain vehicle speed is reached and data acquired at the time of an inflection point of the vehicle speed.

SUMMARY

The above information processing device extracts data by focusing only on the vehicle speed. Therefore, the above information processing device cannot extract data according to characteristics of data other than the vehicle speed. There is a demand for an information processing device capable of obtaining extracted data that captures characteristics of the entire original data including a plurality of feature quantities.

In order to address the above issue, an aspect provides an information processing device that acquires original data collected and prepared over a predetermined period using a sensor mounted on a vehicle and that extracts data to be used to calculate a damage rate of an electric oil pump from the original data, the information processing device including a processing device that executes a process, in which:

the original data include a rotational speed of the electric oil pump as a feature quantity;

the processing device executes a search process including a first step of calculating relative frequency distribution in the original data about the feature quantity included in the original data for each feature quantity, a second step of setting a plurality of time windows for cutting out data for a part of a period of the original data such that a period obtained by totaling periods of all the time windows is shorter than the predetermined period, a third step of cutting out data from the original data using the time windows, a fourth step of calculating relative frequency distribution in extracted data obtained by combining the data cut out using the time windows for each feature quantity, and a fifth step of calculating an error between the relative frequency distribution in the original data and the relative frequency distribution in the extracted data; and the processing device extracts the extracted data whose error is equal to or less than a threshold by executing the search process that repeatedly makes trials to execute the second step to the fifth step while changing settings of the time windows after executing the first step.

In one aspect of the information processing device, the processing device may execute clustering that is machine learning to classify data in sections obtained by dividing the original data for each certain period into a predetermined number of clusters. The processing device may set the time windows in the second step such that a difference between a ratio of each cluster in the extracted data and a ratio of each cluster in an entirety of the original data is equal to or less than a threshold.

This information processing device can extract extracted data whose amount of data is less than that of the original data and from which an analysis result with an accuracy equivalent to that of the original data is obtained. Thus, the information processing device can both reduce the amount of data of the extracted data from that of the original data and maintain the accuracy of the extracted data.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Information Processing System

Figure 1:
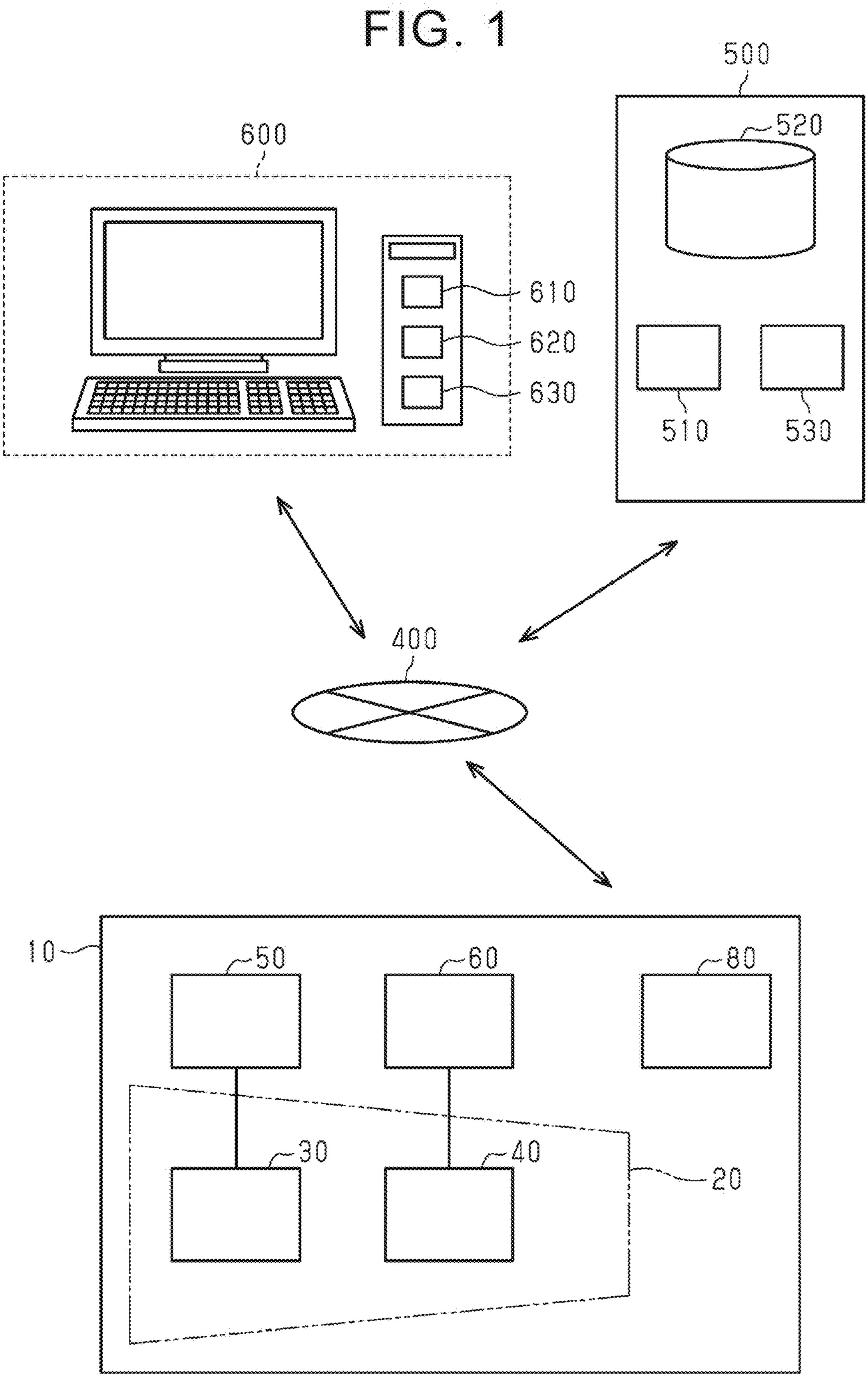
FIG. 1 is a schematic diagram illustrating a relationship between a data center, a vehicle, and an information processing terminal, which is an embodiment of an information processing device.

Hereinafter, the data center 500, which is an embodiment of the information processing device, will be described with reference to FIG. 1 to FIG. 7. FIG. 1 shows a configuration of an information processing system including a data center 500. As shown in FIG. 1, the data center 500 communicates with the vehicle 10 via a communication network 400. The data center 500 also communicates with the information processing terminal 600 via the communication network 400. The data center 500 communicates with the plurality of vehicles 10 and the plurality of information processing terminals 600 via the communication network 400.

Configuration of the Data Center 500

As illustrated in FIG. 1, the data center 500 includes a processing device 510. The data center 500 includes a storage device 520 and a communication device 530. The processing device 510 includes a CPU that executes processing in accordance with a program, and a ROM in which the program is stored. The storage device 520 stores a large amount of data. The communication device 530 is implemented as hardware such as a network adapter, various communication software, or a combination thereof. The communication device 530 realizes wired or wireless communication via the communication network 400.

Configuration of the Vehicle 10

The data center 500 may be configured using a plurality of computers. For example, the data center 500 may be configured by a plurality of server apparatuses. Each of the plurality of vehicles 10 includes a communication device 80. The communication devices 80 are implemented as hardware such as a network adapter, various communication software, or a combination thereof. These communication devices 80 are configured to realize wired or wireless communication via the communication network 400.

A power transmission device 20 is mounted on each vehicle 10. The power transmission device 20 is a device for transmitting the power of the engine. For example, the power transmission device 20 includes a planetary gear type automatic transmission. The power transmission device 20 includes a motor generator 30 and an electric oil pump 40.

A battery is electrically connected to the motor generator 30 via an inverter. The motor generator 30 supplies electric power to the battery by using the power of the engine, or supplies a driving force to the driving wheels by using the electric power supplied from the battery.

The electric oil pump 40 obtains electric power from a secondary battery mounted on the vehicle and supplies hydraulic pressure to each element constituting the power transmission device 20. For example, each of the elements constituting the power transmission device 20 includes an engagement element of the automatic transmission, a clutch between the rotation shaft of the motor generator 30 and the crankshaft, and the like.

The vehicle 10 includes a motor generator control device 50 and an electric oil pump control device 60. The motor generator control device 50 controls the motor generator 30. The electric oil pump control device 60 controls the electric oil pump 40. The motor generator control device 50 and the electric oil pump control device 60 are equipped with various sensors that collect information on each part of the vehicle 10.

In each vehicle 10, travel data is collected from the various sensors. The traveling data is transmitted from each vehicle 10 to the data center 500 by the communication device 80. For example, travel data including the travel distance, the position information, and the vehicle speed of each vehicle 10 is transmitted from each vehicle 10 to the data center 500. The travel data also includes various data indicating the state of the electric oil pump 40 of the vehicle 10. Identification information for identifying the respective vehicles 10 is also transmitted from the respective vehicles 10 to the data center 500 together with the traveling data.

The data center 500 stores the traveling data together with the received identification information in the storage device 520. In this way, traveling data of the plurality of vehicles 10 is accumulated in the storage device 520 of the data center 500.

Configuration of the Information Processing Terminal 600

The information processing terminal 600 includes a processing device 610, a storage device 620, and a communication device 630. The processing device 610 includes a CPU that executes processing in accordance with a program, and a ROM in which the program is stored. The storage device 620 stores data. The communication device 630 is implemented as hardware such as a network adapter, various communication software, or a combination thereof. The communication device 630 realizes wired or wireless communication via the communication network 400. The information processing terminal 600 is, for example, a personal computer.

Analysis of Travel Data of the Vehicle 10

The information processing terminal 600 is used to analyze travel data. When analyzing the traveling data, an instruction for executing the analysis is transmitted from the information processing terminal 600 to the data center 500. The processing device 510 of the data center 500 that has received the instruction performs analysis using a part of travel data among the enormous travel data stored in the storage device 520 of the data center 500. The travel data to be used is selected from the enormous amount of travel data stored in the storage device 520 in accordance with the purpose of analysis.

For example, the processing device 510 calculates a load applied to a specific component of the specific vehicle 10 based on travel data of the specific vehicle 10. The processing device 510 estimates the damage accumulated in the component based on the calculated load. For example, the processing device 510 calculates an index value indicating the magnitude of the damage accumulated in the electric oil pump 40 of the specific vehicle 10 based on the traveling data of the specific vehicle 10. The processing device 510 of the data center 500 outputs the calculated result by transmitting the calculated result to the information processing terminal 600. The information processing terminal 600 that has received the result displays the received result. In order to perform such an analysis, the processing device 510 analyzes a large amount of travel data collected over a long period of time. Since the processing device 510 needs to perform an enormous amount of computation, it takes a long time to analyze.

Therefore, it is conceivable to extract the extracted data that captures the features of the entire original data from a large amount of travel data that is the original data. If such extracted data can be extracted, the processing device 510 can perform analysis in a shorter time by using the extracted data. For example, in the case of estimating the damage of the electric oil pump 40 when the vehicle travels for one hundred thousand hours, the processing device 510 estimates the damage using the extracted data for twenty thousand hours extracted from the original data for one hundred thousand hours. The processing device 510 then multiplies the index value calculated from the extracted data for twenty thousand hours by 5 to calculate the index value of the damage of the electric oil pump 40 when the vehicle travels for one hundred thousand hours.

Figure 2:
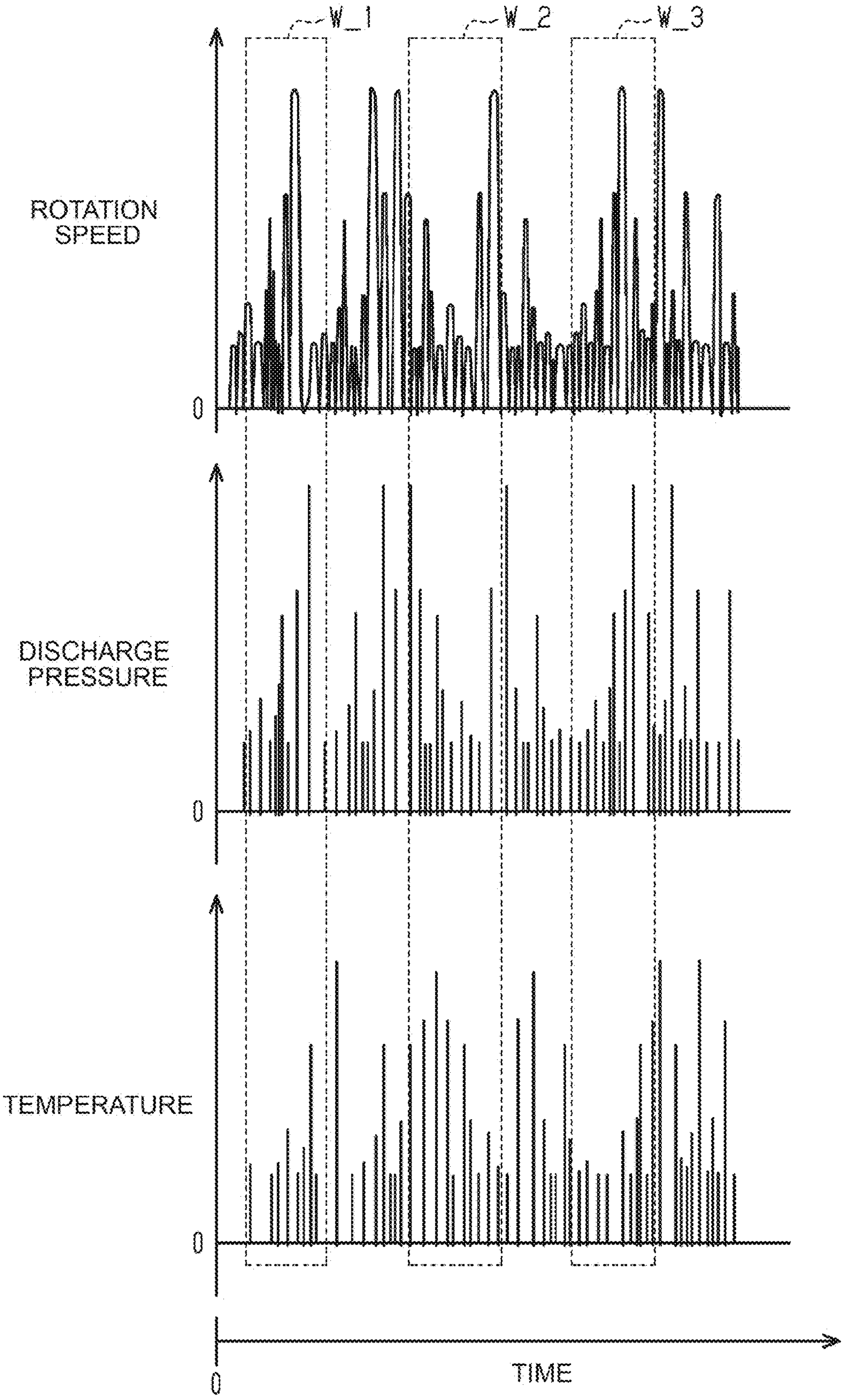
FIG. 2 is a graph showing the original data, wherein the upper figure shows the transition of the rotational speed of the electric oil pump, the middle figure shows the transition of the discharge pressure of the electric oil pump, and the lower figure shows the transition of the temperature of the electric oil pump.

FIG. 2 illustrates an example of original data. The original data illustrated in FIG. 2 is travel data for one hundred thousand hours in one vehicle 10. The original data illustrated in FIG. 2 includes, as the feature amount, the number of revolutions of the electric oil pump 40 to be subjected to calculation of the index value of damage, the discharge pressure of the electric oil pump 40, and the temperature of the electric oil pump 40.

The upper diagram of FIG. 2 shows the transition of the rotational speed of the electric oil pump 40 for one hundred thousand hours. The number of revolutions of the electric oil pump 40 corresponds to the number of times the hydraulic pressure of the electric oil pump 40 is supplied. The rotational speed of the electric oil pump 40 is detected by a sensor provided in the vehicle 10.

The middle diagram of FIG. 2 shows the change in the discharge pressure of the electric oil pump 40 for one hundred thousand hours. The discharge pressure of the electric oil pump 40 corresponds to the hydraulic pressure supplied to each element of the power transmission device 20 by the electric oil pump 40. The discharge pressure of the electric oil pump 40 is detected by a sensor provided in the vehicle 10. The discharge pressure of the electric oil pump 40 may be an actual measurement value or a predicted value. The discharge pressure of the electric oil pump 40 can be predicted from, for example, the line pressure of the automatic transmission or the torque of the electric oil pump 40.

The lower diagram of FIG. 2 shows the temperature transition of the electric oil pump 40 for one hundred thousand hours. The temperature of the electric oil pump 40 may be an actual measurement value or a predicted value. As the temperature of the electric oil pump 40, for example, the oil temperature may be used as a predicted value of the temperature of the electric oil pump 40. The integrated value of the value obtained by multiplying the outside air temperature by the engine load may be used as a predicted value of the temperature of the electric oil pump 40.

The original data includes, as feature values, information on the rate of change of the rotational speed of the electric oil pump 40 and the continuous operation time of the electric oil pump 40. The rate of change of the rotational speed of the electric oil pump 40 is calculated from the transition of the rotational speed of the electric oil pump 40. The continuous operation time of the electric oil pump 40 is also calculated from the transition of the rotational speed of the electric oil pump 40. The continuous operation time is a time period from when the electric oil pump 40 is operated and the number of revolutions becomes 0 or more until when the number of revolutions becomes 0 and stops. The continuous operating time is counted each time the electric oil pump 40 is activated.

The extracted data is created by clipping the data from the original data by a plurality of time windows. In FIG. 2, as an example of a plurality of time windows, three time windows of the first time window W_1, the second time window W_2, and the third time window W_3 are indicated by broken lines. The beginning and end of each time window are set such that the respective time windows do not overlap. In this example, the traveling data for twenty thousand hours is extracted as the extracted data. Therefore, the start and end periods of each time window are set so that the total length of the time periods of all the time windows is twenty thousand hours.

The data center 500 searches for the setting of the start time and the end time of each time window indicating the cut-out pattern for extracting the extracted data that captures the features of the entire original data. The data center 500 extracts the extracted data from the original data by using the cut-out pattern found by the search. The data center 500 performs analysis using the extracted data.

Searching for Cut Patterns

Figure 3:
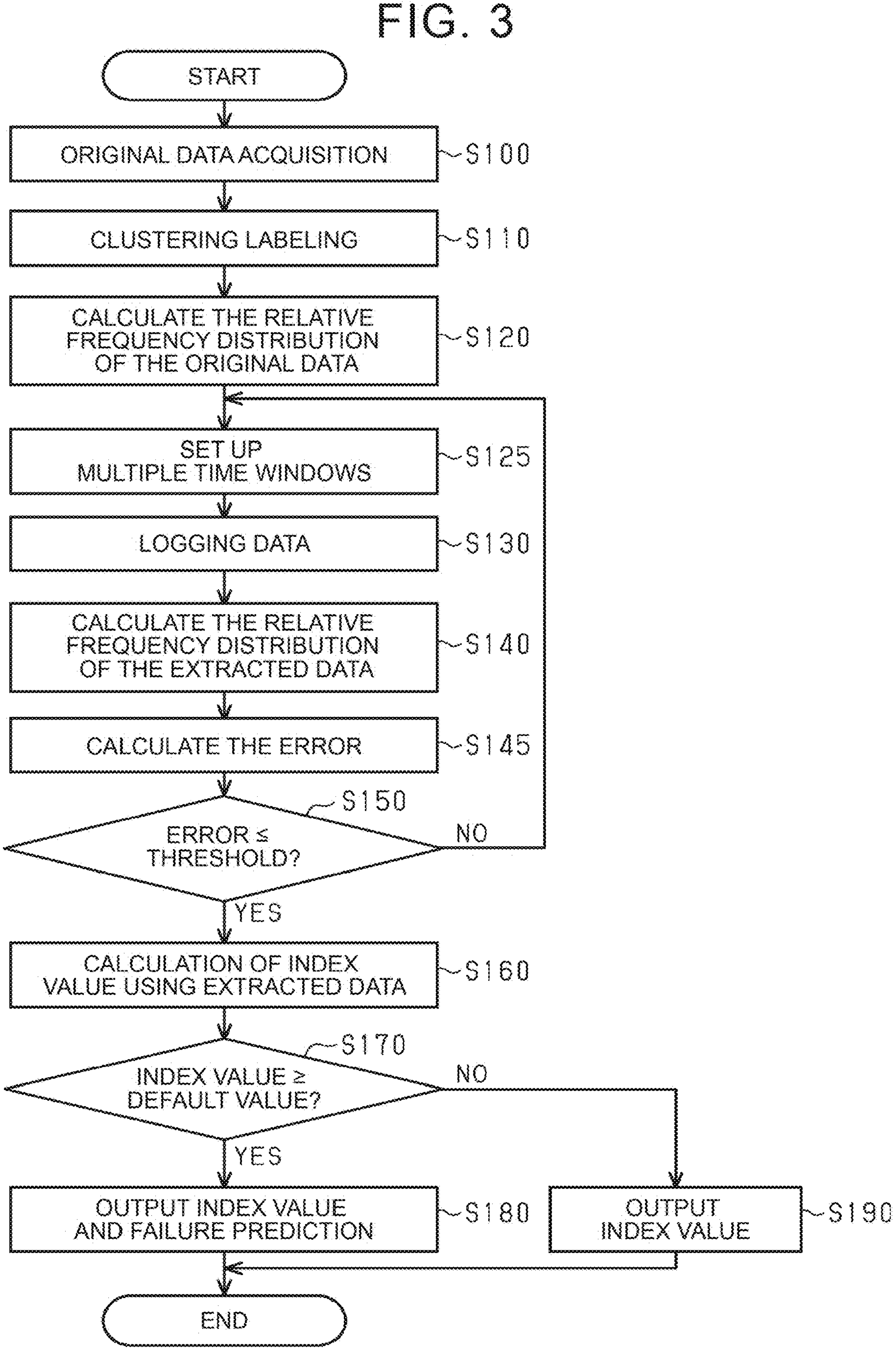
FIG. 3 is a flowchart illustrating a flow of processing executed by the processing device of the data center.

FIG. 3 is a flowchart illustrating a flow of a series of processes related to the extraction pattern search process. This series of processing is executed by the processing device 510 of the data center 500.

As illustrated in FIG. 3, the processing device 510 acquires the original-data in the processing of S100. The original data is a part of the travel data selected for the purpose of analysis from the enormous travel data stored in the storage device 520 of the data center 500. For example, the original data for calculating the index value indicating the magnitude of the damage accumulated in the electric oil pump 40 of one vehicle 10 is travel data for a predetermined period of the target vehicle 10 selected from the huge travel data of the plurality of vehicles 10. For example, in the case of estimating the damage of the electric oil pump 40 when traveling for one hundred thousand hours, the original data is traveling data over a predetermined period of the target vehicle 10.

In the process of S110, the processing device 510 labels the original data by clustering. Specifically, the processing device 510 divides the original data at regular intervals. The length of the period for separating the original data is, for example, several minutes. Then, the processing device 510 executes clustering which is machine learning for classifying the data of each section into a predetermined number of clusters. For example, k-means method is used as the algorithm of clustering, k-means method is a clustering algorithm for classifying data into a predetermined number of clusters. The clustering algorithm is not limited to k-means method.

The original data includes travel data collected under different environments, such as travel data when traveling in an urban area, travel data when traveling in a suburban area, and travel data when traveling on an expressway. By performing clustering, the travel data included in the original data can be classified into clusters of travel data having similar characteristics. The number of clusters to be classified is arbitrarily set according to the contents of the analysis.

Figure 4:
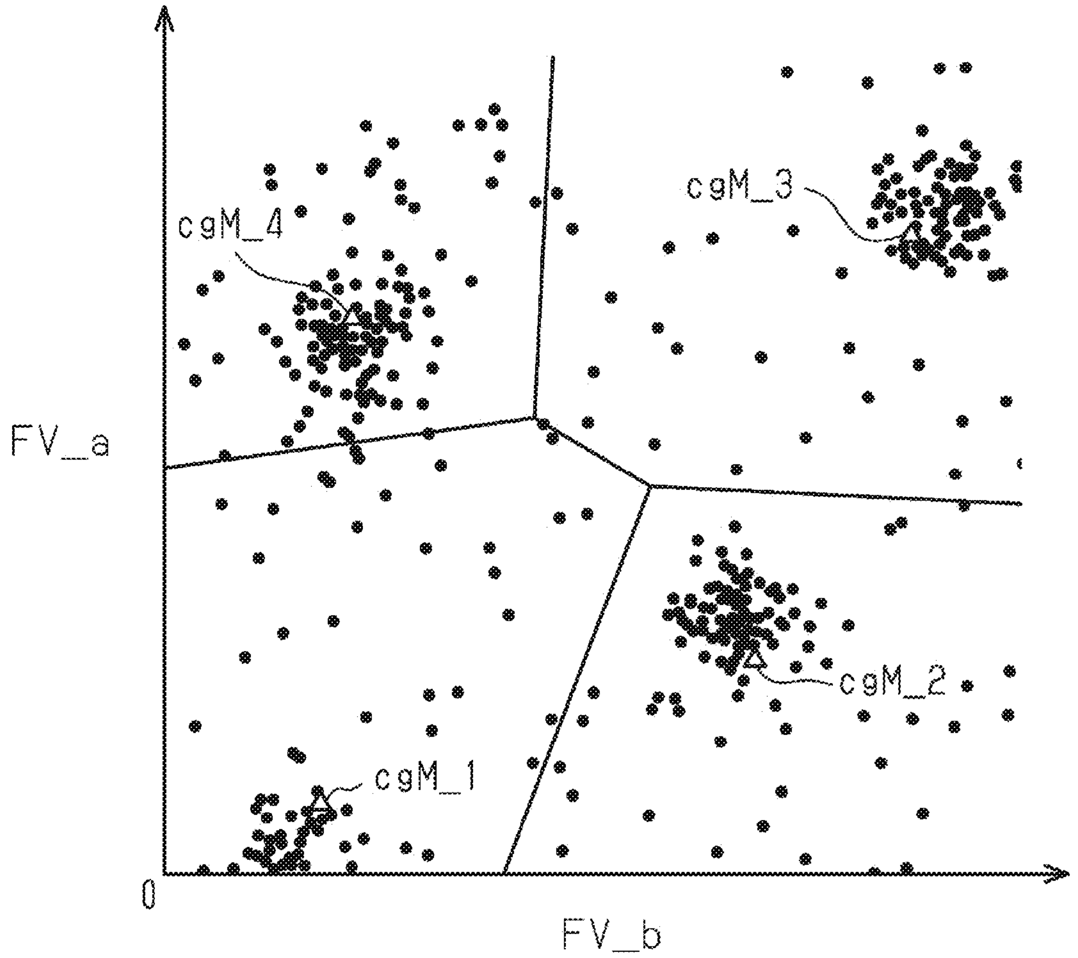
FIG. 4 is a graph showing an example in which original data is clustered using two feature amounts.

FIG. 4 is a graph illustrating an exemplary clustering of original data into four clusters by a k-means method using two features included in the original data as explanatory variables. In FIG. 4, each piece of data in each section partitioned from the original data is indicated by a single point. When performing clustering, the processing device 510 uses a representative value of an explanatory variable in the data of each section. For example, the processing device 510 sets the average value of the feature amounts in the data of each section as a representative value. The processing device 510 may use, as the representative value, the moving average value of the feature amounts in a plurality of consecutive sections in time series.

In FIG. 4, these points are shown in a two-dimensional space with the first feature amount FV_a and the second feature amount FV_b as coordinate axes. FIG. 4 is an example in which original data is clustered in four clusters of the first cluster M_1, the second cluster M_2, the third cluster M_3, and the fourth cluster M_4. In FIG. 4, the boundaries of the four clusters are indicated by solid lines. In FIG. 4, the center of gravity of each cluster is indicated by an open triangle. The center of gravity cgM_1 is the center of gravity of the first cluster M_1. The center of gravity cgM_2 is the center of gravity of the second cluster M_2. The center of gravity cgM_3 is the center of gravity of the third cluster M_3. The center of gravity cgM_4 is the center of gravity of the fourth cluster M_4.

Although FIG. 4 shows two examples of explanatory variables, the number of explanatory variables is not limited to two. For example, when the original data includes three feature amounts, the processing device 510 may perform clustering using these three feature amounts as explanatory variables. In this case, the processing device 510 clusters the original data in the three-dimensional space.

The processing device 510 assigns a label indicating the result of the clustering in this way to the original data. Specifically, each data indicated by a point in the coordinate space is given a label for identifying a cluster in which the data is classified. In this way, the processing device 510 creates the original data to which the label is attached.

Next, the processing device 510 calculates the relative-frequency distribution of the original-data in the process of S120. As described above, the original data includes a plurality of feature amounts. The processing device 510 calculates a relative frequency distribution in the original data for each feature amount.

The frequency distribution classifies data into a plurality of classes, and represents a frequency distribution that is the number of data of each class. The relative frequency indicates how much the frequency of the class accounts for the sum of the total frequencies.

Figure 5:
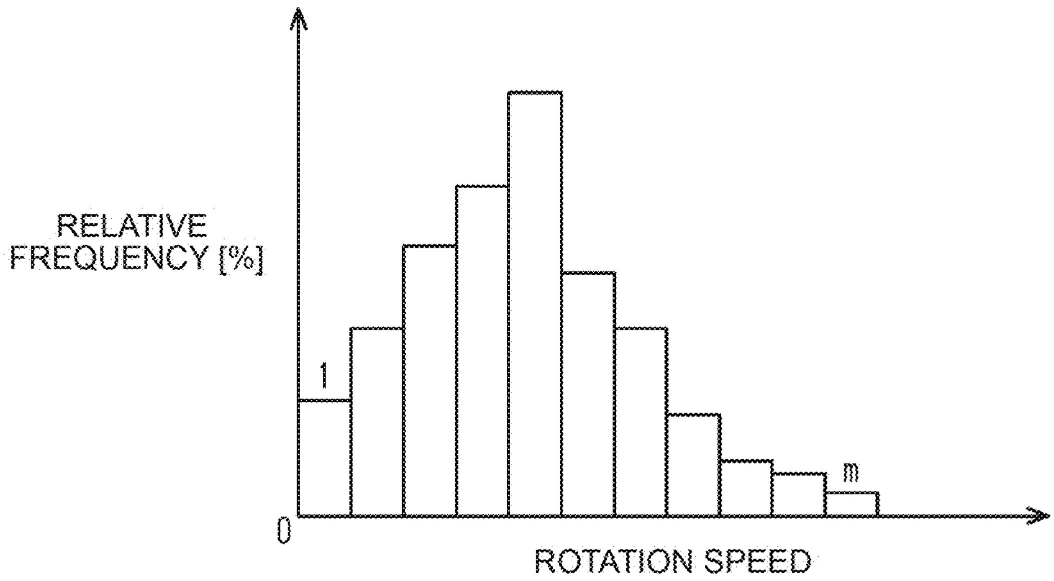
FIG. 5 is a graph showing an example of the relative frequency distribution for the rotational speed of the electric oil pump in the original data.

FIG. 5 shows the relative frequency distribution of the rotational speed of the electric oil pump 40 in the original data shown in FIG. 2. In this relative frequency distribution, the class of the rotational speed of the electric oil pump 40 in the original data is divided into m classes from 1 to m, and the relative frequency distribution is shown.

Figure 6:
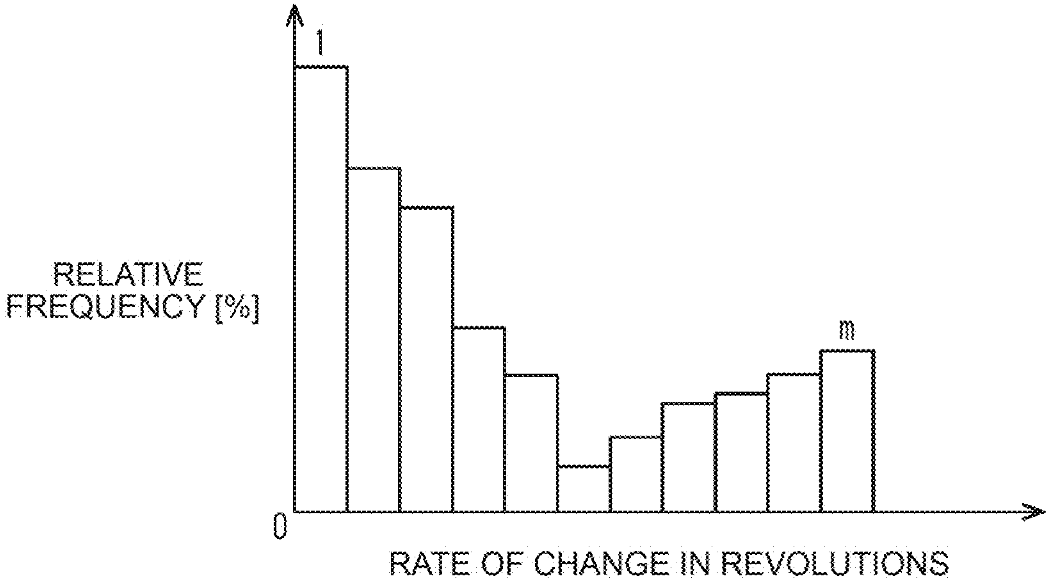
FIG. 6 is a graph showing an example of the relative frequency distribution for the rate of change of the rotational speed of the electric oil pump in the original data.

FIG. 6 shows the relative frequency distribution for the rate of change of the rotational speed of the electric oil pump 40 in the original data. In this relative frequency distribution, the class of the rate of change of the rotational speed of the electric oil pump 40 in the original data is divided into m classes from 1 to m, and the relative frequency distribution is shown.

Figure 7:
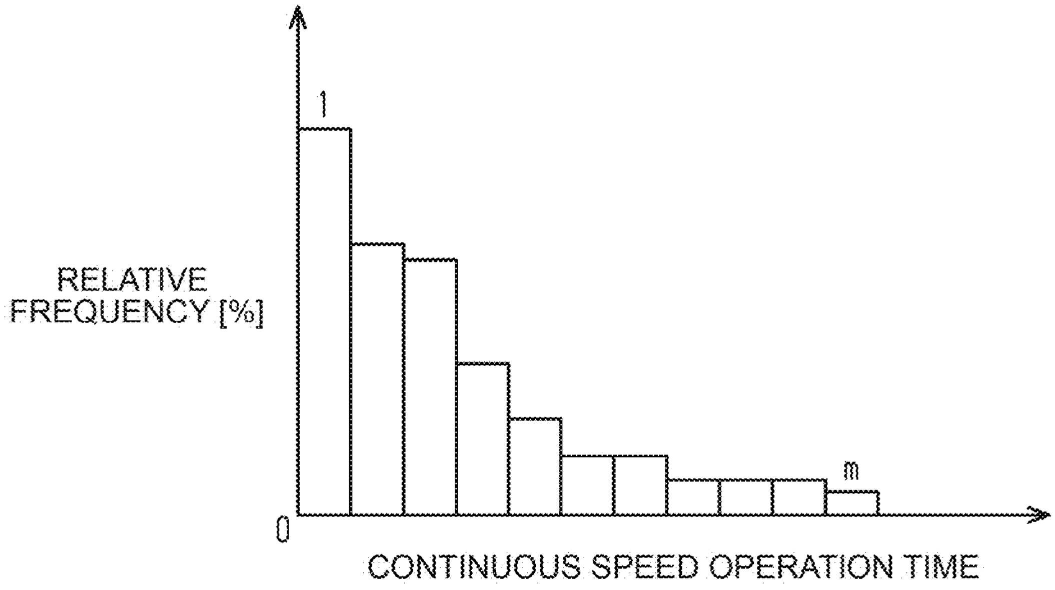
FIG. 7 is a graph showing an example of the relative frequency distribution for the continuous operation time of the electric oil pump in the original data.

FIG. 7 shows the relative frequency distribution for the continuous operating time of the electric oil pump 40 in the original data. In this relative frequency distribution, the class of the continuous operation time of the electric oil pump 40 in the original data is divided into m classes from 1 to m, and the relative frequency distribution is shown.

In the process of S120, the processing device 510 calculates the relative-frequency-distribution for the respective feature values included in the original-data. The number of classes in the relative frequency distribution of each feature is the same.

For example, in a case where the original data includes, as the feature amount, five feature amounts of the rotation speed of the electric oil pump 40, the discharge pressure of the electric oil pump 40, the temperature of the electric oil pump 40, the rate of change of the rotation speed of the electric oil pump 40, and the continuous operation time of the electric oil pump 40, the processing device 510 calculates the relative frequency distribution of each of these five feature amounts.

Next, in the process of S125, the processing device 510 sets a plurality of time-windows in order to extract the extracted data from the original data. FIG. 2 shows three time windows W_1 to W_3 of the first time window W_1, the second time window W_2, and the third time window W_3 as an example of a plurality of time windows. In the example shown in FIG. 2, the time periods of each time window are all equal. As illustrated in FIG. 2, the data cut out by each cut-out window is data of each feature amount in the same period.

In the process of S125, the processing device 510 randomly sets a plurality of time windows such that the total time period of all time windows is shorter than a predetermined time period, which is the total time period of the original data. As will be described later, the processing device 510 combines all the data cut out by the plurality of time windows set here to generate extracted data. The total time period of all the time windows is a value for determining the capacity of the extracted data. Therefore, a period in which all the time windows are summed is set in advance.

For example, the processing device 510 randomly sets the number of time windows, the start of each time window, and the end of each time window each time the process of S125 is executed. At this time, the processing device 510 sets each time window so that each time window does not overlap. The processing device 510 thus randomly sets the plurality of time windows such that the total period of all time windows is a preset period. In the process of S125, the processing device 510 may set a plurality of time windows by fixing the time periods of the time windows to be constant, as illustrated in FIG. 2. In the process of S125, the processing device 510 may fix the plurality of time windows to a fixed number and set the plurality of time windows.

In addition to the above-described requirements, when setting a plurality of time windows through S125, the processing device 510 sets a plurality of time windows such that a difference between a ratio of each cluster in the extracted data and a ratio of each cluster in the entire original data is equal to or less than a threshold.

In this way, by setting a plurality of time-windows through the process of S125, a cut-out pattern in which data is cut out from the original data is determined. When the processing device 510 determines the cut-out pattern in this way, the processing proceeds to S130.

In the process of S130, the processing device 510 cuts out data from the original data in the determined cutout pattern. That is, in the process of S130, the processing device 510 cuts out data from the original data by a plurality of set time-windows. Then, the processing device 510 combines all the data cut out by the plurality of time windows to create extracted data.

In the following process of S140, the processing device 510 calculates the relative-frequency distribution of the extracted data. The processing device 510 calculates the relative frequency distribution of the extracted data in the same manner as the method of calculating the relative frequency distribution in S120. In other words, in the process of S140, the processing device 510 calculates the relative-frequency distribution of the extracted data for each feature value. At this time, the processing device 510 sets the number of grades in the relative frequency distribution of the respective feature amounts to be the same as the relative frequency distribution in S120.

For example, when the original data includes five characteristic quantities, i.e., the number of revolutions of the electric oil pump 40, the discharge pressure of the electric oil pump 40, the temperature of the electric oil pump 40, the rate of change of the number of revolutions of the electric oil pump 40, and the continuous operation time of the electric oil pump 40, the processing device 510 calculates the relative frequency distributions of the five characteristic quantities in S140.

Next, in the process of S145, the processing device 510 calculates an error between the relative frequency distribution in the original data and the relative frequency distribution in the extracted data. For example, the processing device 510 calculates a mean absolute error MAE (Mean Absolute Error). The mean absolute error MAE is expressed by the following equation.

$$MAE = \frac{1}{n}\sum_{i=1}^{n}\sum_{j=1}^{m}|Y_{nm} - y_{nm}|$$

In the above equation, "n" is the number of feature quantities. "m" is the number of series in the relative frequency distribution. "Y" is the frequency of the corresponding feature amount in the original data in the corresponding class. "y" is the frequency of the corresponding feature amount in the extracted data in the corresponding class.

As shown in the above equation, the processing device 510 calculates, as an error, the sum of the errors of the frequencies in the respective classes for each feature amount between the relative frequency distribution in the entire original data and the relative frequency distribution in the extracted data.

After calculating the error, the processing device 510 advances the processing to S150. In the process of S150, the processing device 510 determines whether or not the calculated error is less than or equal to the thresholds. The threshold value is a value for determining whether or not the extracted data having the relative frequency distribution close to the relative frequency distribution in the original data is extracted by the set cutout pattern. The magnitude of the threshold is set in advance so that it can be determined that extracted data having a relative frequency distribution close to the relative frequency distribution in the original data is extracted based on the error being equal to or smaller than the threshold.

In the process of S150, when it is determined that the error is equal to or smaller than the threshold (S150: YES), the processing device 510 advances the process to S160.

In the process of S160, the processing device 510 calculates the target index using the extracted data generated in the latest process of S130. Here, an index value indicating the magnitude of the damage accumulated in the electric oil pump 40 is calculated. For example, the processing device 510 calculates the damage rate of the electric oil pump 40 as an index value indicating the magnitude of damage accumulated in the electric oil pump 40.

The damage rate is an index value representing a ratio of the damage accumulated in the current electric oil pump 40 when the allowable limit of the index value of the damage accumulated in the electric oil pump 40 is set to "1". Here, the damage rate is calculated based on at least one of the number of revolutions of the electric oil pump 40, the discharge pressure of the electric oil pump 40, and the temperature of the electric oil pump 40. The allowable limit can be set arbitrarily. The allowable limit may be a limit value at which the electric oil pump 40 fails, or may be a limit value at which the electric oil pump 40 needs to be replaced. When the allowable limit becomes "1", it means that the electric oil pump 40 fails or needs to be replaced, and the calculated damage rate is a value from "0" to "1".

Here, since the damage rate is calculated using the extracted data which is a part of the original data, the processing device 510 converts the calculated damage rate into a size corresponding to the original data, and calculates the damage rate as the index value. For example, when the original data is traveling data for one hundred thousand hours and the extracted data is traveling data for twenty thousand hours, the calculated damage rate is multiplied by 5 to obtain a damage rate as an index value.

On the other hand, in the process of S150, when it is determined that the error is larger than the threshold (S150: NO), the processing device 510 returns the process to S125. Then, the processing device 510 re-executes the search process from S125 to S145.

In this way, the processing device 510 repeatedly executes the search process from S125 to S145 by changing the settings of the plurality of time-windows, and extracts extracted data in which the error becomes equal to or less than the threshold value from the original data. Then, the processing device 510 calculates an index value using the extracted data. After calculating the index, the processing device 510 advances the processing to S170.

In the process of S170, the processing device 510 determines whether or not the index value is equal to or greater than a predetermined value. The default value is a value for predicting that the probability of occurrence of a failure is high based on the fact that the index value is equal to or larger than the default value. For example, "0.9" can be set as a default value in the damage rate. In this case, based on the fact that the damage accumulated in the electric oil pump 40 has reached 90% of the damage that leads to the failure, it is possible to predict that the possibility of the failure is high.

In the process of S170, when it is determined that the index value is equal to or greater than the predetermined value (S170: YES), the processing device 510 advances the process to S180. In the process of S180, the processing device 510 outputs an index and a failure estimate. Specifically, the processing device 510 transmits the index value and the failure prediction to the information processing terminal 600 that has transmitted the instruction for requesting the analysis.

The failure prediction is, for example, a message indicating that the occurrence of a failure has been predicted. In this way, when the calculated index value is equal to or greater than the predetermined value, the processing device 510 notifies that the occurrence of the failure has been predicted. The failure prediction may be information of a lifetime until a failure occurs. For example, when the damage rate calculated by using the extracted data extracted from the original data for one hundred thousand hours is the index value, the processing device 510 calculates the travel time until the damage rate reaches "1" and outputs the calculated travel time as the life information. The information on the life may be converted into the traveling distance based on the traveling distance of one hundred thousand hours and output.

In the process of S170, when it is determined that the index value is less than the predetermined value (S170: NO), the processing device 510 advances the process to S190. In the process of S190, the processing device 510 outputs an index. Specifically, the processing device 510 transmits the index value to the information processing terminal 600 that has transmitted the instruction for requesting the analysis. When the process of S180 or S190 is executed, the processing device 510 terminates the series of processes.

Operation of this Embodiment

The data center 500, which is the information processing device of the present embodiment, acquires original data collected and created over a predetermined period using a sensor mounted on the vehicle 10, and calculates an index value indicating the magnitude of damage accumulated in the electric oil pump 40.

The data center 500 includes a processing device 510 that executes processing. The original data includes data of the number of revolutions of the electric oil pump 40, the discharge pressure of the electric oil pump 40, the temperature of the electric oil pump 40, the rate of change of the number of revolutions of the electric oil pump 40, and the continuous operation time of the electric oil pump 40 as the characteristic quantity. In the data center 500, the search process executed by the processing device 510 includes a first step (S120) of calculating, for each feature quantity, a relative frequency distribution in the original data for a plurality of feature quantities included in the original data. The searching process includes a second step (S125) of setting a plurality of time windows for cutting out data of a part of the period of the original data such that the period of time of all the time windows is less than the predetermined period of time. The search process includes a third step (S130) of extracting data from the original data by a plurality of time-windows. The search process includes a fourth step (S140) of calculating, for each characteristic quantity, the relative frequency distribution in the extracted data obtained by combining all the data cut out by the plurality of temporal windows. The search process includes a fifth step (S145) of calculating an error between the relative frequency distribution in the original data and the relative frequency distribution in the extracted data. After executing the first step, the processing device 510 executes a search process in which the trials from the second step to the fifth step are repeatedly executed by changing the settings of a plurality of time windows. Then, the processing device 510 extracts the extracted data in which the error is equal to or less than the threshold (S150: YES). The processing device 510 calculates an index value using the extracted data in which the error becomes equal to or smaller than the threshold value (S160).

According to the data center 500, it is possible to obtain extracted data in which features of the entire original data including a plurality of feature amounts are captured. Therefore, the data center 500 can calculate the index value with the same accuracy as in the case of using the original data by using the extracted data having a smaller data amount than the original data.

Effect of this Embodiment

According to the data center 500 that is the information processing device of the present embodiment, it is possible to extract extracted data that has a smaller data amount than the original data and that can obtain an analysis result with an accuracy equivalent to that of the original data.

According to the data center 500 that is the information processing device of the present embodiment, it is possible to achieve both reduction in the amount of data and calculation accuracy of the index value.

According to the data center 500 which is the information processing device of the present embodiment, it is possible to calculate the index value in a shorter time than in the case where the original data is used.

The processing device 510 performs clustering, which is machine learning for classifying the data of the sections obtained by dividing the original data into a predetermined number of clusters at regular intervals (S110). Then, in the second step (S125) of the search process, the processing device 510 sets a plurality of time-windows such that the difference between the ratio of each cluster in the extracted data and the ratio of each cluster in the entire original data is equal to or less than the threshold.

A plurality of sections classified into the same cluster are sections having similar characteristics. In the above-described search process, the setting output from the processing device 510 is a setting in which the difference between the ratio of the entire original data and each cluster is equal to or less than the threshold value, and the extracted data having the relative frequency distribution of each feature amount close to each other can be extracted.

Therefore, according to the search process executed by the data center 500, it is possible to find a setting that can obtain extracted data closer to the characteristics of the entire original data.

The processing device 510 terminates the search process when one piece of extracted data whose error becomes equal to or smaller than the threshold value can be extracted, and calculates an index value using the extracted data whose error becomes equal to or smaller than the threshold value. Therefore, the data center 500 can calculate an index value at a time point when one piece of extracted data whose error becomes equal to or smaller than the threshold value can be extracted, and output the result promptly.

When the calculated index value is equal to or greater than the predetermined value (S170: YES), the processing device 510 notifies that a failure has been predicted. Therefore, the data center 500 can notify the user that the occurrence of the failure has been predicted before the failure occurs.

The processing device 510 calculates the damage rate as the index value. Therefore, the data center 500 can inform the user of how long the delay until the failure is reached.

Example of Change

The present embodiment can be modified to be implemented as follows. The present embodiment and modifications described below may be carried out in combination within a technically consistent range.

As the characteristic quantity, the rotational speed of the electric oil pump 40, the discharge pressure of the electric oil pump 40, the temperature of the electric oil pump 40, the rate of change of the rotational speed of the electric oil pump 40, and the continuous operation time of the electric oil pump 40 are exemplified. However, the index value may be calculated according to at least one of the five feature values.

In the above embodiment, an example in which the information processing device is embodied as the data center 500 has been described. An example in which the index value is calculated in the data center 500 has been described. On the other hand, the information processing device described above may be embodied as the information processing terminal 600. In this case, the calculation of the index value is executed by the processing device 610 of the information processing terminal 600. The above-described information processing device may be embodied as a control device of the vehicle 10. In this case, the calculation of the index value can also be performed by the control device of the vehicle 10. For example, the calculation of the index value may be performed by the motor generator control device 50 or the electric oil pump control device 60 of the vehicle 10.

An example has been described in which the data center 500, which is an information processing device, executes extraction of extracted data from original data and calculation of an index value. In contrast, the information processing device may be an apparatus that performs extraction of extracted data from original data. For example, the data center 500 may extract the extracted data from the original data and transmit the extracted data to the information processing terminal 600. In this case, the information processing terminal 600 that has received the extracted data calculates the index value. For example, the motor generator control device 50 of the vehicle 10 may extract the extracted data from the original data and transmit the extracted data to the data center 500. In this case, the data center 500 that has received the extracted data calculates the index value.

In the above-described embodiment, an example has been described in which one piece of extracted data is extracted and an index value is calculated. On the other hand, a final index value may be determined by extracting a plurality of pieces of extracted data and using a plurality of index values calculated using the respective pieces of extracted data. For example, the minimum value, the maximum value, the mode value, and the average value are set as final index values. Further, a plurality of index values may be output.

In the above-described embodiment, an example has been described in which, when the index value is equal to or larger than a predetermined value, it is notified that the occurrence of a failure has been predicted. This may be omitted. After the index value is calculated, only the process of S190 may be executed, and only the index value may be outputted.

Although the damage rate is exemplified as an example of the index value to be calculated, the index value to be calculated is not limited to the damage rate. The index value of the damage of the plurality of electric oil pumps 40 may be calculated. The relative frequency distribution may be calculated for each feature amount of each electric oil pump 40, and the cut-out pattern may be searched so that the error of the relative frequency distribution for all feature amounts becomes small.

For each electric oil pump 40, the cut-out pattern may be searched so that the relative frequency distribution becomes smaller with respect to the characteristic quantity. The index value may be calculated for each electric oil pump 40.

The processing device 510 sets a plurality of time windows such that a difference between a ratio of each cluster in the original data and a ratio of each cluster in the extracted data is equal to or smaller than a threshold value. Without such a restriction, the processing device 510 may set a plurality of time windows. In such cases, the process of S110 clustering may be omitted.

The method of determining the setting of the time window in the cut-out pattern may not be random. The trial may be repeated by changing the setting of the time window in the clipping pattern according to a preset rule.

The error calculated in the process of S145 is not limited to the mean absolute error MAE. For example, the processing device 510 may calculate a mean square error as an error. The processing device 510 may calculate a root mean square error as an error.

An example using extracted data obtained by combining all extracted data is shown. On the other hand, some of the extracted data may be combined to create extracted data.

What is claimed is:

1. An information processing device comprising a processor configured to:
- acquire original data collected and prepared over a predetermined period using a sensor mounted on a vehicle;
- extract data to be used to calculate a damage rate of an electric oil pump from the original data; and
- execute a search process including:
  - a first step of calculating, for each of a plurality of feature quantities included in the original data, a relative frequency distribution in the original data,
  - a second step of setting a plurality of time windows for cutting out data for a part of a period of the original data such that a period obtained by totaling periods of all the time windows is shorter than the predetermined period,
  - a third step of cutting out data from the original data using the time windows,
  - a fourth step of calculating, for each of the plurality of feature quantities, a relative frequency distribution in extracted data obtained by combining the data cut out using the time windows, and
  - a fifth step of calculating an error between the relative frequency distribution in the original data and the relative frequency distribution in the extracted data, wherein
- the original data includes data on a rotational speed of the electric oil pump as the plurality of feature quantities; and
- the processor is further configured to extract the extracted data whose error is equal to or less than a threshold by executing the search process that repeatedly makes trials to execute the second step to the fifth step while changing settings of the time windows after executing the first step.

2. The information processing device according to claim 1, wherein:
- the processor is further configured to execute clustering that is machine learning to classify data in sections obtained by dividing the original data for each certain period into a predetermined number of clusters; and
- the processor is further configured to set the time windows in the second step such that a difference between a ratio of each cluster in the extracted data and a ratio of each cluster in an entirety of the original data is equal to or less than a threshold.

3. The information processing device according to claim 1, wherein the processor is further configured to terminate the search process in a case where one piece of the extracted data whose error is equal to or less than the threshold is successfully extracted, and calculate the damage rate using the extracted data whose error is equal to or less than the threshold.

4. The information processing device according to claim 1, wherein:
- the plurality of feature quantities further includes data on a temperature of the electric oil pump and a discharge pressure of the electric oil pump; and
- the processor is further configured to calculate the damage rate based on at least one of the rotational speed, the discharge pressure of the electric oil pump, and the temperature of the electric oil pump.

5. The information processing device according to claim 4, wherein the processor is further configured to calculate the damage rate using the extracted data whose error is equal to or less than the threshold, and make a notification that occurrence of a failure has been predicted in a case where the damage rate is equal to or more than a predetermined value.

6. The information processing device according to claim 1, wherein
- the plurality of time windows are randomly set for each trial of the search process by randomly determining:
  - (i) the number of the plurality of time windows;
  - (ii) a start time of each of the plurality of time windows; and
  - (iii) an end time of each of the plurality of time windows.

7. The information processing device according to claim 1, wherein
- the plurality of time windows are set in the second step such that none of the time windows overlap with each other.

* * * * *